United States Patent [19]

Sato

[11] Patent Number: 5,809,058
[45] Date of Patent: Sep. 15, 1998

[54] CODE DIVISION MULTIPLE ACCESS SIGNAL RECEIVING APPARATUS FOR BASE STATION

[75] Inventor: Toshifumi Sato, Tokyo, Japan

[73] Assignee: NEC Corporation, Tokyo, Japan

[21] Appl. No.: 357,288

[22] Filed: Dec. 13, 1994

[30] Foreign Application Priority Data

Dec. 16, 1993 [JP] Japan ................................ 5-316154

[51] Int. Cl.$^6$ ................................................. H04L 29/02
[52] U.S. Cl. ........................ 375/200; 370/342; 370/291; 379/411; 364/724.16
[58] Field of Search ................................. 375/200, 205, 375/206, 207, 232; 370/18, 24, 107, 95.3, 29, 110.1, 276, 294, 342, 345, 291; 455/32.1, 34.1, 38.1; 380/33; 364/724.16; 379/411

[56] References Cited

U.S. PATENT DOCUMENTS

| | | | |
|---|---|---|---|
| 5,099,493 | 3/1992 | Zeger et al. | 375/200 |
| 5,170,412 | 12/1992 | Massey | 375/1 |
| 5,181,225 | 1/1993 | Neeser et al. | 375/1 |
| 5,216,691 | 6/1993 | Kauffmann | 375/205 |
| 5,224,122 | 6/1993 | Bruckert | 375/200 |
| 5,233,626 | 8/1993 | Ames | 375/200 |
| 5,353,300 | 10/1994 | Lee et al. | 375/205 |
| 5,375,140 | 12/1994 | Bustamante et al. | 375/200 |
| 5,488,629 | 1/1996 | Takahashi | 375/206 |
| 5,544,155 | 8/1996 | Lucas et al. | 370/18 |

FOREIGN PATENT DOCUMENTS

| | | |
|---|---|---|
| 4-323926 | 11/1992 | Japan . |
| 4-351130 | 12/1992 | Japan . |

OTHER PUBLICATIONS

IEEE Journal on Selected Areas in Communication, vol. 8, No. 4, May 1990, New York, NY, pp. 683–690, Xie, et al., "A Family of Suboptimum Detectors for Coherent Multiuser Communications".

Vehicular Tech. Society 42nd VTS Conference, vol. 1, No. 10–13, May 1992, New York, Ny, pp. 71–74, Abdlrahman, et al., "Equalization for Interference Cancellation in Spread Spectrum Multiple Access Systems."

Haykin, S., "Adaptive Filter Theory", 1991, Englewood Cliffs, Prentice Hall, NJ, pp. 165–168.

Signal Processing VI—Theories and Applications. Proceedings of EUSIPCO–92, 6th European Signal Processing Conference, vol. III, 24–27 Aug. 1992, Amsterdam, Netherlands, pp. 1591–1594, Mowbray, et al., "Adaptive CDMA Co–channel Interference Cancellation."

Primary Examiner—Wellington Chin
Assistant Examiner—Jean B. Corrielus
Attorney, Agent, or Firm—Foley & Lardner

[57] ABSTRACT

A CDMA signal receiving apparatus for a base station includes a spread-spectrum demodulation section which has a plurality of channel-signal processing sections and a common-signal processing section. Each of the channel-signal processing section receives a digital spread-spectrum modulated base band signal and performs a reception processing of a channel signal by means of spread-spectrum demodulation using common data, wherein the channel signal refers to a digital spread-spectrum demodulated base band signal destined to the channel of concern. The common-signal processing section computes, from the digital spread-spectrum modulated base band signal, values required in common to all of the channel-signal processing sections for the spread-spectrum demodulation to be processed in each of the channel-signal processing sections, and outputs the values as the common data.

6 Claims, 2 Drawing Sheets

CODE DIVISION MULTIPLE ACCESS SIGNAL RECEIVING APPARATUS FOR BASE STATION

BACKGROUND OF THE INVENTION

1. Field of the Invention

The present invention relates to a CDMA (Code Division Multiple Access) receiver for a mobile communication system such as a mobile telephone and portable telephone system (a cellular system), and particularly to an apparatus that lessens the scale of hardware of a transmitter and a receiver for canceling interference between channels.

2. Description of the Related Art

As a prior art of a digital mobile telephone and portable telephone system having a cellular layout, the Japan standard system (PDC: RCR STD 27A), and the North America Standard System (ETSI GSM) have been known in which the time division multiple access (TDMA) scheme is adopted. The North America Standard System (TIA IS95) has been also known in which the CDMA scheme is employed.

In Japanese Patent Laid-open Nos. 323926/92 (hereinafter, referred to as reference 1) and 351130/92 (hereinafter, referred to as reference 2), CDMA receivers are described. The receiver of reference 1 is directed to receiving a DSSS (Direct Sequence Spread Spectrum) signal and is characterized in that the base band signal is recovered from the DSSS signal not through a matched filter or a correlator as is an ordinary case, but through an inverse filter. The tap coefficients of the filter are adjusted so that the filter provides an output response of approximately Kronecker delta-function characteristic to an incoming spectrum-spreading PN (Pseudo-random Noise) code which specifies an individual channel allocated to the receiver. The reason for using the inverse filter is that a POP (Peak to Off Peak) ratio is high in an inverse filter compared to a matched filter, the high POP ratio allowing the output response of the filter to have the delta-function characteristic. In addition, the PN code sequences are established so that the inverse filter has the maximum processing gain. In this way, the technical advantage of the spread spectrum modulation technique can effectively serve for the cellular mobile communication system The reference 2 provides a method of multiple access for simultaneously exchanging a plurality (say N) of data streams communicated between a plurality of subscribers in a communication system. In this method, the N data sequences are spectrum-spread using a single PN code sequence to produce corresponding N DSSS signals. In transmission, the N spectrum-spread sequences are superposed in a single transmission signal, wherein the superposition is effected by shifting different sequences of the DSSS signals by a time interval longer than a prescribed minimum value. On the reception side, the received signal is filtered by means of a spread-spectrum demodulation filter which demodulates the common PN code modulation to recover the N original base band signals shifted by the time interval. In this way, the merits of the TDMA and CDMA methods can be incorporatively realized. In particular, communications of users can be virtually completely free from interference without necessitating any exact synchronization normally required for a TDMA system.

In the TDMA method, however, a problem has been that, since it is impossible to cancel same-frequency interference, the same frequency can be employed only in the cells "remote" from each other. For this reason, a cellular telephone system has been divided into clusters each made up of say four or seven cells so that the cells belonging to different clusters may be "remote" in the sense described above, and that the same frequency can not be used within the same cluster. Such layout, however, results in a low utilization efficiency of frequencies. Moreover, a narrow frequency bandwidth allocated per one channel in the TDMA system makes it impossible to separate multipath fading, thereby making in a frequency diversity effect unrealizable, and thus entailing a cell layout of a large fading margin.

The CDMA system, on the other hand, has advantages that the same frequency is usable throughout all of the cells and that the diversity effect is realizable by a simple RAKE receiver. Even this system, however, is incapable of completely canceling interference between channels. This gives rise to a drawback that signal reception can not be accomplished unless under a strict control of the power of the transmitted signal in the case that CDMA transmission is applied to an up-access from a mobile telephone to a base station.

In order to obviate the above drawback, a method is proposed in Japanese Patent Application No. 169092 (hereinafter, referred to as reference 3), in which the interference is eliminated with a spread-spectrum demodulation adaptive filter. However, a problem has been that an RLS algorithm employed in order to have tap coefficients of the filter converge with a short sequence of a training signal, as is the case of reference 3, tends to require a large scale of hardware.

The object of the present invention is to offer a receiver provided with a spread-spectrum demodulation adaptive filter for a base station, having a lessened scale of hardware.

SUMMARY OF THE INVENTION

In order to attain the object above, a CDMA signal receiving apparatus according to the present invention comprises a reception antenna and radio reception means for demodulating a radio signal to produce an analog spread-spectrum modulated base band signal, analog-to-digital converter means to convert the analog spread-spectrum modulated base band signal to a digital spread-spectrum modulated base band signal, a plurality of channel-signal processing means each belonging to an individual channel, each of the channel-signal processing means receiving the digital spread-spectrum modulated base band signal and performing a reception processing of the channel-signal by means of spread-spectrum demodulation using common data, wherein the channel-signal refers to a digital spread-spectrum demodulated base band signal destined to the channel of concern, common-signal processing means for computing, from the digital spread-spectrum modulated base band signal, values required in common to all of the channel-signal processing means for the spread-spectrum demodulation to be processed in each of the channel-signal processing means in order to deliver the values as said common data, and clock signal generating means for supplying a clock signal to all of the means except for the reception antenna and the radio reception means.

Since single common-signal processing means takes charge of computations required in common to all of the channel-signal processing means, the hardware of the signal receiving apparatus of the present invention is lessened as compared with the hardware in the case that each of the channel-signal processing means independently performs calculations to determine the filter coefficients as is the case of prior art.

When the least squares algorithm is employed to determine the filter coefficients, the computation of the correlation function matrix is preferably allotted to the common-signal processing means.

When the recursive least square algorithm is employed, the computation of the vector gain is preferably allotted to the common-signal processing means.

The above and other objects, features, and advantages of the present invention will become apparent from the following description referring to the accompanying drawings which illustrate examples of preferred embodiments of the present invention.

DETAILED DESCRIPTION OF THE PREFERRED EMBODIMENTS

Figure 1:
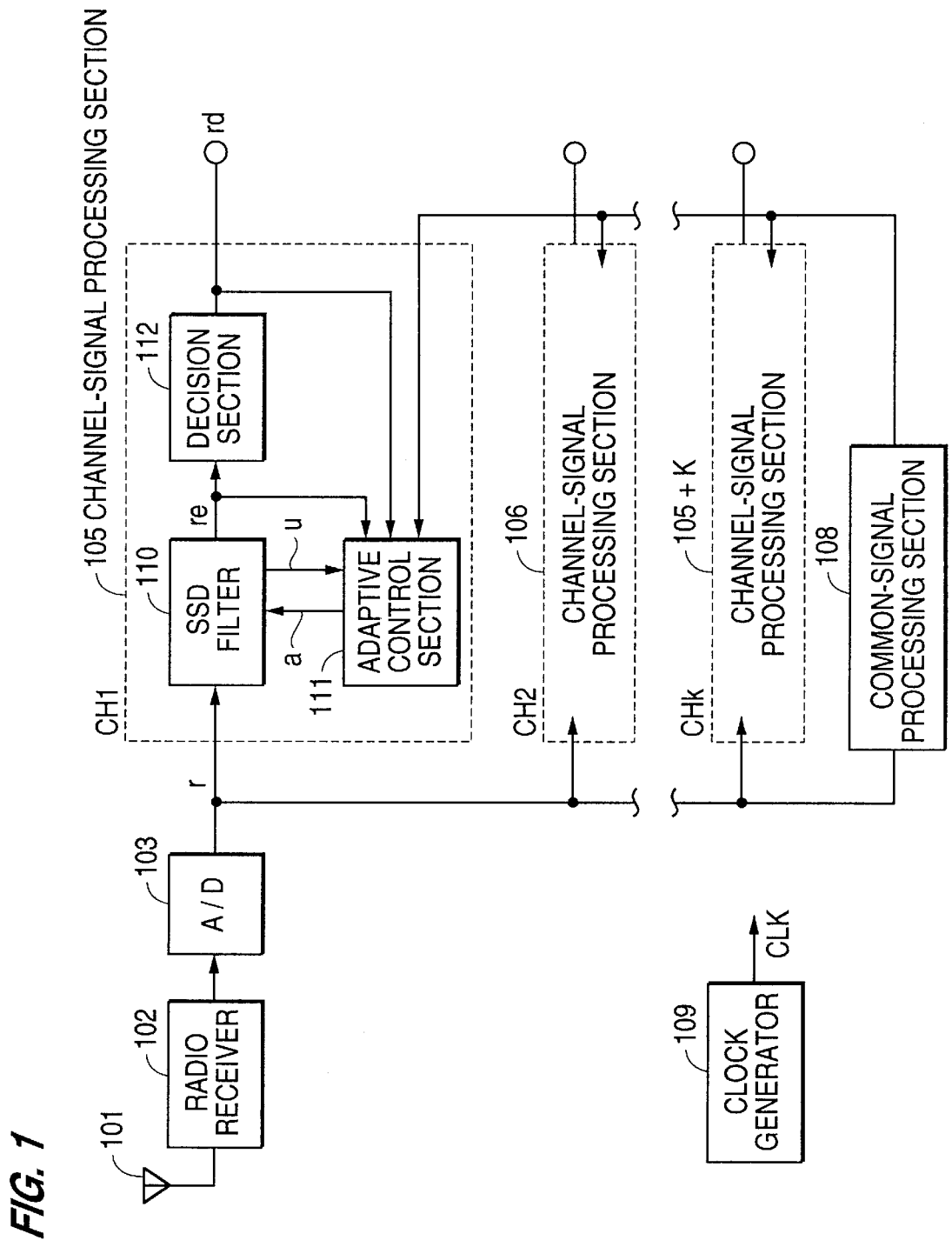
FIG. 1 is a block diagram illustrating an embodiment of the present invention.

FIG. 1 shows a block diagram illustrating a preferred embodiment of the present invention.

With rerference to FIG. 1, the receiver apparatus for a CDMA base station according to the present invention comprises a reception antenna 101, a radio receiver section 102 for demodulating an incoming radio signal to produce a multiplexed base band signal r of analog spread-spectrum modulated base band signals (hereafter, referred to as analog ssm base band signals) for a plurality of channels currently on access, an analog-to-digital converter 103 for converting the analog ssm base band signal to digital spread-spectrum modulated base band signals (hereinafter, referred to as digital ssm base band signals), channel-signal processing sections 105,106, . . . , 105+k−1 for k channels CH1, CH2, . . . , CHk, a common signal processing section 108 for executing signal processing common to all of the channels allocated to the base station concerned, and a clock generator section 109 for supplying clock signals to the analog-to-digital converter 103, the channel processing sections 105,106, . . . , 105+k−1, and the common signal processing section 108. The output of the common-signal processing section 108 is distributed to all channel-signal processing sections as common data.

Each of the channel-signal processing sections 105 . . . 105+k is provided with an adaptive filter 110 for spread-spectrum demodulation, an adaptive control section 111, and a decision section 112. The spread-spectrum demodulation filter 110 receives the multiplexed base band signal r and passes the base band signal which designates the channel concerned. Hereinafter, the function of the spread-spectrum demodulation filter through which the base band signal of interest is filtered from the multiplexed base band signal r will be referred to as spread-spectrum demodulation (ssd), and a spread-spectrum demodulated base band signal will be referred to as a channel signal. Decision section 112 decides a digital value of the channel signal and outputs a result of the decision as a decision signal. Adaptive control section 111 computes, from both the decision signal used as a desired response of adaptive filter 110 and the common data, values peculiar to the channel-signal processing section required for the spread-spectrum demodulation to be processed and computes the set of the filter coefficient values from the common data and the values peculiar to the channel-signal processing section.

Figure 2:
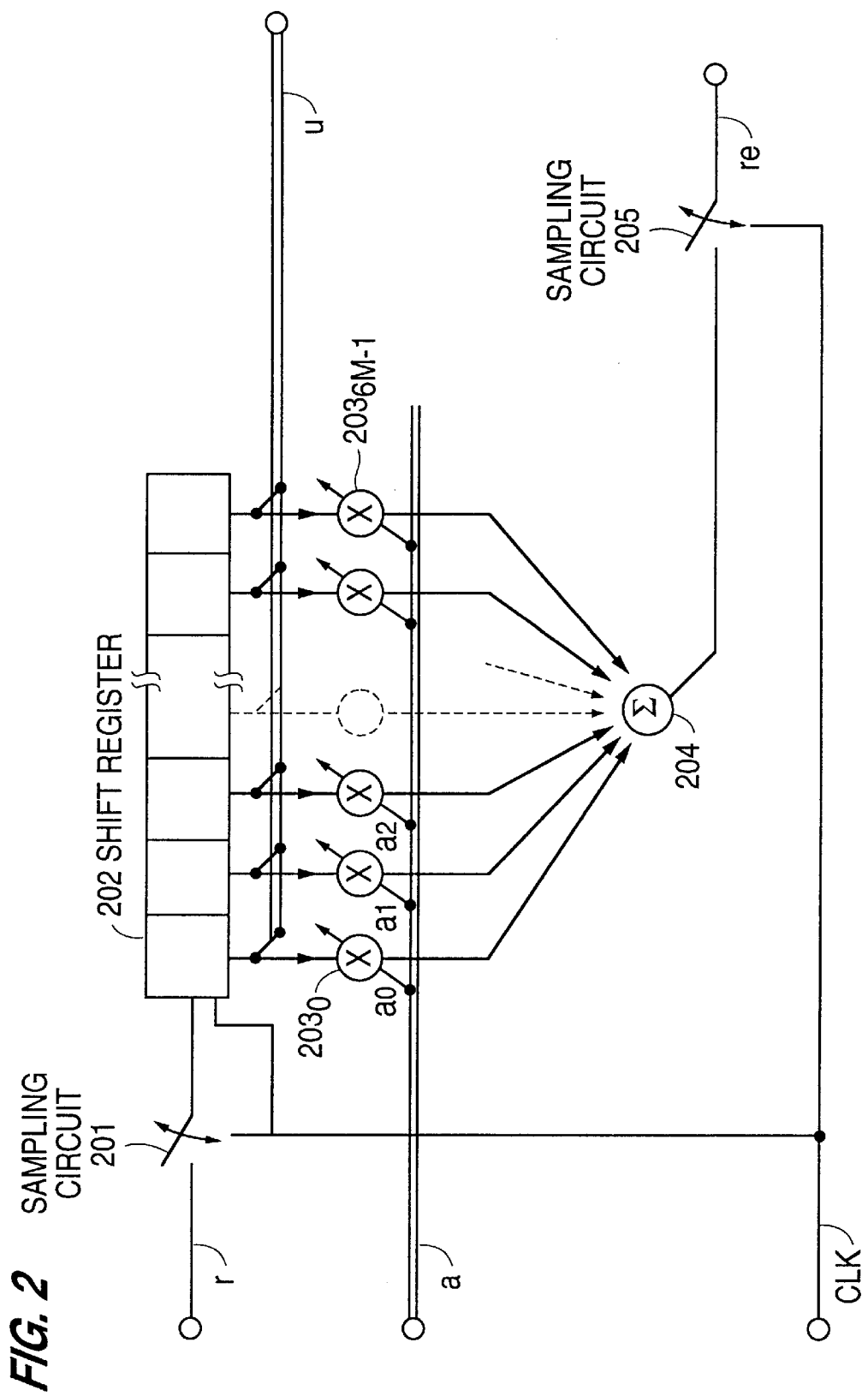
FIG. 2 is a block diagram showing a structure of an example of a spread-spectrum demodulation adaptive filter.

FIG. 2 shows a schematic diagram of an example of the spread-spectrum demodulation filter 110 applied to the present invention. The filter 110 comprises sampling circuits 201, 205, a shift register 202, a variable coefficient multipliers $203_0$, $203_1$, . . . , $203_{6M-1}$ and an adder 204. Sampling circuit 201 samples the multiplexed base band signal r of digital ssm base band signals modulated with pseudo noise (PN) codes or spread spectrum codes corresponding to designated channels. The sampling rate is twice the chip rate $f_c$ in the present embodiment. Shift register 202 serves as a delay line of an FIR adaptive filter. The number of taps is prescribed to be 6M, wherein M denotes a spread-spectrum ratio for the CDMA transmission, and tap spacing is made half the chip period.

A set of the filter coefficients $[a_0, a_1, \ldots, a_{6M-1}]$ is supplied from adaptive control section 111 to adaptive filter 110, while a set of tap inputs $[u_0, u_1, \ldots, u_{6M-1}]$ is supplied to adaptive control section 111 from adaptive filter 110. Each of the tap inputs $u_i$ (i=0,1, . . . 6M−1,) is multiplied by the corresponding filter coefficient $a_i$ by means of multipliers $203_i$ to produce a set of weighted tap outputs $[a_0 u_0, a_1 u_1, \ldots a_{6M-1} u_{6M-1}]$ which are then summed up by an adder 204. The resultant sum is sampled by the sampling circuit 205 at a symbol period to produce an output of the spread-spectrum demodulation filter.

Now the operation of the CDMA receiving apparatus of the present invention will be described below. In the CDMA system, the same radio frequency is designated to all of the channels allotted to a base station. Accordingly, the same circuits are shared by all of the channels belonging to the same base station at the stages of receiving an incoming radio signal, demodulating the received radio signal to produce an analog base band signal, and converting the analog base band signal to a digital base band signal. For this reason, antenna 101, radio receiver section (demodulator) 102, and analog-to-digital converter 103 offer common services to all the channels of the base station of interest.

The multiplexed base band signal r includes the base band signal components of other channels as well as of the channel of interest, these components being multiplexed in accordance with the CDMA scheme. Thus, the signal components of other channels act as interference signals with the the signal component of interest. In order to take out exclusively the base band signal component of interest (the channel signal) from the multiplexed base band signal r, the present invention is directed to performing a spread spectrum demodulation employing a spread-spectrum demodulation filter rather than using a matched filter or an inverse filter having an output response of a Kronecker delta function characteristic (cf. reference 2 above).

In a mobile communication system, a multipath fading phenomenon often takes place due to an out-of-perspective communication as is normally had between a base station and a mobile telephone as well as due to motion of a mobile telephone. Under such circumstances, the adaptive control section has to adjust the filter coefficients so as to track the variation in transmission characteristic caused by the multipath fading. The RLS (Recursive Least Square) algorithm is employed in the present embodiment to take advantage of its fast convergence (fast tracking) characteristic.

According to the LS (Least Squares) algorithm, the normal equation for an adaptive filter is formulated to be (cf. S.

Haykin, "Introduction to Adaptive Filter", Macmillan Publishing Company New York, 1984; translation: K. Takebe, 1987, Chapter 5):

$$Q(n)a(n)=q(n) \tag{1}$$

, where a(n) represents a 6M-dimensional column vector of filter coefficients at a discrete time n expressed in a unit of a sampling period, Q(n) represents a 6M×6M autocorrelation matrix of tap inputs $u_j=u(n-j)$, j=0,1,2, . . . , 6M−1 with a k,m element $$Q_{km}=\Sigma u(i-k)u(i-m), \tag{2}$$

Σ representing a sum over i=1 through i=n, and q(n) denotes a 6M×1 cross correlation matrix of tap inputs and desired responses d(i) of the adaptive filter at a discrete time i with a k,1 element $$q_k=\Sigma d(i)u(i-k). \tag{3}$$

Under the assumption that Q(n) is not singular, it follows that $$a(n)=Q(n)^{-1}q(n)=P(n)q, \tag{4}$$

where P(n) is an inverse matrix of Q(n).

Basically, since the computation of P is required in common for all of the channel-signal processing sections, the calculation is executed by the common signal processing section 108. Conversely, since q includes parameters d(i) peculiar to each of the channel-signal processing sections, the calculation of q and the calculation of product of P and q represented on the right side of the equation (4) are performed by the adaptive control section of each channel-signal processing section.

It is preferred to recursively compute the filter coefficients a in accordance with the recursive formula derived from the equation (4). The way of deriving the recursive formula given loc. cit. (S. Haykin) is summarized as follows:

Let the column vector of the tap inputs be u(n)=[ u(n) u(n−1) u(n−2) . . . u(n−6M+1)]$^T$, the superscript T denoting a transposed matrix, and a gain vector be $$k(n)=P(n-1)u(n)/(1+u^T(n)P(n-1)u(n)), \tag{5}$$

then the recursive formulas of the autocorrelation and cross correlation matrices are derived directly from the definitions represented in equations (2) and (3), respectively.

$$P(n)=P(n-1)-k(n)u^T(n)P(n-1), \tag{6}$$

$$q(n)=q(n-1)+d(n)u(n). \tag{7}$$

Substituting equations (6), (7) into the normal equation (1) gives $$a(n)=a(n-1)+d(n)[P(n-1)u(n)-k(n)u^T(n)P(n-1)u(n)]-k(n)u^T(n)a(n-1). \tag{8}$$

From equation (5), the term enclosed with the bracket on the right side of equation (8) is equal to k(n). Thus, $$a(n)=a(n-1)+k(n)[d(n)-u^T(n)a(n-1)]. \tag{9}$$

The bracket term on the right side of equation (9) represents an error e(n) in the filter output with respect to the desired response d(n) at a discrete time n. Thus the update term, the second term of the right side of equation (9), is obtained by multiplying the error e by the gain vector k.

Since k depends only on the tap inputs u and their autocorrelation as is known from equation (5), the gain vector k(n) is calculated by common signal processing section 108. Accordingly, once the filter coefficients a(n−1) are determined, the adaptive control section 111 computes the error e, determines the update value from the error and gain vector k supplied from the common signal processing section 108, and updates the filter coeffients a.

During the time period immediately after a burst signal reception begins, a transmitter and a receiver exchange prescribed training signals until the tap coefficients of the adaptive FIR filter (the filter coefficients) converge. The operation of the channel-signal processing section to make the filter coefficients converge begins with initial conditions:

$$P=I/c, \tag{10}$$

$$a=0, \tag{11}$$

where I denotes a 6M×6M unit matrix, 0 denotes a 6M-dimentional null vector, and c denotes a small positive constant determined depending on the initial value of the autocorrelation matrix Q (cf. Haykin loc. cit.), and M being the spread spectrum ratio as described above.

After the filter coefficients a converge, the decision section 112 provides correct decided data rd. The adaptive control section 111 controls the filter coefficients a so as to track variations of characteristics of the transmission path by recursively updating the filter coefficients a to minimize the error signal power $e^2$ of the adaptive filter outputs re=$u^{T(n)a(n-}$1).

In most cases, the causes of error creation are signal components of other channels (interference signals) and thermal noise of the receiver. Accordingly, when the interference signal power>> the noise signal power, the spread-spectrum demodulation filter acts to effectively cancel the interference signals.

As described above, the CDMA receiving apparatus for a base station according to the present invention offers an advantage of having a reduced hardware scale of the apparatus, by dividing the procedures required for adaptive control of the spread-spectrum demodulation filter into the procedures common to all of the channels allotted to the base station and the procedures for individual channels and by allowing the common procedures to be carried out by a single common signal processing section.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A code-division-multiple-access signal receiving apparatus for a base station which effects signal reception processing of a plurality of channels, comprising:

a reception antenna and radio reception means for demodulating a radio signal to produce an analog spread-spectrum base band signal;

analog-to-digital converter means for converting the analog spread-spectrum modulated base band signal to a digital spread-spectrum modulated base band signal;

a plurality of channel-signal processing means each belonging to an individual channel, each of said channel-signal processing means receiving said digital spread-spectrum modulated base band signal and performing a reception processing to obtain a channel signal by means of spread-spectrum demodulation using common data, wherein said channel signal refers to a base band signal that is destined to the corresponding individual channel; and common-signal processing means for computing, from said digital spread-spectrum modulated base band signal, values required in common to all of said channel-signal processing means for the spread-spectrum demodulation to be processed in each of said channel-signal processing means in order to output the values as said common data, wherein each of said channel-signal processing means has
  a transversal adaptive filter for spread-spectrum demodulation characterized by a set of filter coefficient values to recover said channel signal, each adaptive filter having a same tap number and an identical delay characteristic;
  decision means for deciding a digital value of said channel signal and outputting a result of the decision as a decision signal; and
  adaptive control means which computes, from both said decision signal used as a desired response of said adaptive filter and said common data, values peculiar to said channel-signal processing means required for said spread-spectrum demodulation to be processed and computes the set of the filter coefficient values from both said common data and the values peculiar to said channel-signal processing means.

2. An apparatus as claimed in claim 1, wherein said common-signal processing means computes, as said common data, an N×N matrix $P(n)$ which is an inverse matrix of an N×N matrix $Q(n)$, wherein N corresponds to a tap number of said adaptive filter, and a k,m element of the matrix $Q(n)$ is a correlation function of input signals of the k-th and m-th taps, expressed by $$Q(n;k,m)=\Sigma u(i-k)u(i-m), \text{ k,m}=0,1,\ldots,N-1$$

n denoting a discrete time of concern expressed in a unit of a period of sampling effected before inputting to said adaptive filter, $u(i-k)$ and $u(i-m)$ representing input signals of the k-th tap and the m-th tap, respectively, at discrete time i, $\Sigma$ denoting a sum computed over a progressively shifting interval from i=1 to i=n corresponding to a data length of interest; and wherein said adaptive control means computes N-dimensional column vector $q(n)$ peculiar to the individual channel and a product $P(n)q(n)$, the k-th component of the vector q being $$q(n;k)=\Sigma d(i)u(i-k), \text{ k}=0,1,\ldots,N-1$$

and determines said set of filter coefficients by equating the product $P(n)q(n)$ with a filter coefficient vector a in accordance with a least squares algorithm, the vector a being an N-dimensional column vector the k-th component $a(k)$ of which is a filter coefficient for the k-th tap.

3. An apparatus as claimed in claim 2, wherein said common-signal processing means computes a gain vector $k(n)$ as said common data, and said adaptive control means recursively computes $a(n)$ using the recursive formula in accordance with a recursive least squares algorithm, said gain vector being $$k(n)=P(n-1)u(n)/[1+u^T(n)P(n-1)u(n)],$$

said recursive formula being $$a(n)=a(n-1)+k(n)[d(n)-u^T(n)a(n-1)],$$

T denoting a transpose operation of a matrix, and $d(n)$ denoting said decision signal employed as a desired response.

4. A code-division-multiple-access signal receiving apparatus for a base station, comprising:
  a reception antenna configured to receive a radio signal;
  a radio reception circuit connected to said reception antenna and configured to demodulate the radio signal to produce an analog spread-spectrum base band signal;
  an analog-to-digital converter connected to said radio reception circuit and configured to convert said analog spread-spectrum modulated base band signal to a digital spread-spectrum modulated base band signal;
  a plurality of channel-signal processors each belonging to an individual channel, each of said channel-signal processors configured to receive said digital spread-spectrum modulated base band signal from said analog-to-digital converter and to perform a reception processing to obtain a channel signal by performing spread-spectrum demodulation using common data, wherein said channel signal refers to a base band signal that is destined to the corresponding individual channel; and
  a common-signal processor connected to said plurality of channel-signal processors and configured to compute, from said digital spread-spectrum modulated base band signal, values required in common to all of said channel-signal processors for the spread-spectrum demodulation to be processed in each of said channel-signal processors in order to output the values as the common data, wherein each of said channel-signal processors includes
  a transversal adaptive filter for spread-spectrum demodulation characterized by a set of filter coefficient values to recover said channel signal, each adaptive filter having a same tap number and an identical delay characteristic;
  a decision circuit configured to decide a digital value of said channel signal and to output a result of the decision as a decision signal; and
  an adaptive controller configured to compute, from both the decision signal used as a desired response of said adaptive filter and said common data, values peculiar to said channel-signal processor required for the spread-spectrum demodulation to be processed and to compute the set of the filter coefficient values from both said common data and the values peculiar to said channel-signal processor.

5. An apparatus as claimed in claim 4, wherein said common-signal processor computes, as said common data, an N×N matrix $P(n)$ which is an inverse matrix of an N×N matrix $Q(n)$, wherein N corresponds to a tap number of the adaptive filter, and a k,m element of the matrix $Q(n)$ is a correlation function of input signals of the k-th and m-th taps, expressed by $$Q(n;k,m)=\Sigma u(i-k)u(i-m), \text{ k,m}=0,1,\ldots,N-1$$

n denoting a discrete time of concern expressed in a unit of a period of sampling effected before inputting to said adaptive filter, $u(i-k)$ and $u(i-m)$ representing input signals of the k-th tap and the m-th tap, respectively, at discrete time i, $\Sigma$ denoting a sum computed over a progressively shifting interval from i=1 to i=n corresponding to a data length of interest; and wherein said adaptive controller computes N-dimensional column vector $q(n)$ peculiar to the individual channel and a product $P(n)q(n)$, the k-th component of the vector q being $$q(n;k)=\Sigma d(i)u(i-k), \; k=0,1,\ldots,N-1$$

and determines said set of filter coefficients by equating the product $P(n)q(n)$ with a filter coefficient vector a in accordance with a least squares algorithm, the vector a being an N-dimensional column vector the k-th component $a(k)$ of which is a filter coefficient for the k-th tap.

6. An apparatus as claimed in claim 5, wherein said common-signal processor computes a gain vector $k(n)$ as said common data, and said adaptive controller recursively computes $a(n)$ using the recursive formula in accordance with a recursive least squares algorithm, the gain vector being $$k(n)=P(n-1)u(n)/[1+u^T(n)P(n-1)u(n)],$$

the recursive formula being $$a(n)=a(n-1)+k(n)[d(n)-u^T(n)a(n-1)],$$

T denoting a transpose operation of a matrix, and $d(n)$ denoting the decision signal employed as a desired response.

* * * * *